United States Patent [19]

Erdelsky

[11] Patent Number: 5,303,576
[45] Date of Patent: Apr. 19, 1994

[54] METHOD OF TESTING FOR LEAKS IN A CLOSED FLUID FILLED SYSTEM AND SYSTEM TESTED BY SUCH METHOD

[75] Inventor: Joseph J. Erdelsky, Jeannette, Pa.

[73] Assignee: Robertshaw Controls Company, Richmond, Va.

[21] Appl. No.: 953,477

[22] Filed: Sep. 29, 1992

[51] Int. Cl.⁵ .................. G01M 3/00; H01H 37/40
[52] U.S. Cl. .................................. 73/40; 73/45.5; 337/321
[58] Field of Search ............... 73/40, 45.5, 49, 49.3, 73/52; 337/306, 320, 321, 326

Primary Examiner—Hezron E. Williams
Assistant Examiner—Michael Brock
Attorney, Agent, or Firm—Candor, Candor & Tassone

[57] ABSTRACT

A method of testing for leaks in a closed fluid filled system and a system tested by such method are provided, the method comprising the steps of disposing the system in a chamber, disposing a fluid in the chamber under a pressure so that if a leak path of a certain size or larger exists in the system such fluid of the chamber will be forced through the leak path to change the fluid condition in the closed volume of the system, removing the system from the chamber after a certain period of time, then subjecting the system to a certain pressure and temperature condition so that an expandable part of the system will be in an adverse expanded position beyond its normal position for that certain pressure and temperature if the leak path of at least a certain size existed, and then detecting the adverse expanded position of the part of the system.

16 Claims, 2 Drawing Sheets

METHOD OF TESTING FOR LEAKS IN A CLOSED FLUID FILLED SYSTEM AND SYSTEM TESTED BY SUCH METHOD

BACKGROUND OF THE INVENTION

1. Field of the Invention

This invention relates to a new method of testing for leaks in a closed fluid filled system and to a closed fluid filled system tested by such method.

2. Prior Art Statement

It is known to provide a method for testing for leaks in a closed fluid filled system that has a part thereof that expands outwardly from an at rest position that occurs when the system is sensing a temperature at or below an at rest temperature to various certain expanded positions in relation to various certain higher temperatures sensed thereby than the at rest temperature. The prior known method comprises the steps of raising the average system temperature to cause the fluid in the system to expand and thus cause an internal pressure in the system, maintaining this elevated temperature-pressure for an extended period of time to cause a loss of fluid from the system through a leak path to the exterior of the system if such leak path is present, and then running the system through a series of temperature tests where the system expansion is measured to determine if a leak path exists in such a system as the system expansion would be less than a designed specification for the system.

SUMMARY OF THE INVENTION

It is one of the features of this invention to provide a new method of testing for leaks in a closed fluid filled system that will increase the sensitivity of the test (such as to detect smaller leak paths), decrease the processing time, simplify the post process measurement, etc.

In particular, it is believed according to the teaching of this invention that by placing the closed fluid filled system in a chamber and then subjecting such system to a fluid under pressure in the chamber that is greater than the fluid pressure in the closed volume of the system while that system is sensing the particular temperature that exists in the chamber, a certain amount of the fluid in the chamber will be forced through any leak path that exists between the exterior of the system to the interior of the system to change the fluid condition in the closed volume of the system and that such change in the fluid condition can be readily subsequently detected.

It is believed that such fluid under pressure in the chamber can comprise a fluid that has molecules thousands of times smaller than the molecules of the fluid in the system so that a leak path many times smaller can be found by the method of this invention or a leak path of the same size can be detected in a much shorter time than the prior known testing method.

Therefore, one embodiment of this invention comprises a method of testing for leaks in a closed fluid filled system that has a part thereof that expands outwardly from an at rest position that occurs when the system is sensing a temperature at or below an at rest temperature to various certain expanded positions in relation to various certain higher temperatures sensed thereby than the at rest temperature, the method comprising the steps of disposing the system in a chamber, disposing a fluid in the chamber under a pressure that is greater than the fluid pressure in the closed volume of the system while sensing the particular temperature that exists in the chamber so that if at least one leak path of a certain size or larger exists in the system from the exterior thereof to the interior thereof a certain amount of fluid of the chamber will be forced through the at least one leak path to change the fluid condition in the closed volume of the system, removing the system from the chamber after a certain time period, then subjecting the system to a certain pressure and temperature condition so that the part of the system will be in an adverse expanded position beyond its normal position for that certain pressure and temperature if the at least one leak path of at least the certain size existed, and then detecting the adverse expanded position of the part of the system.

Accordingly, it is an object of this invention to provide a new method of testing for leaks in a closed fluid filled system that has a part thereof that expands outwardly from an at rest position that occurs when the system is sensing a temperature at or below an at rest temperature to various certain expanded positions in relation to various certain higher temperatures sensed thereby than the at rest temperature, the method of this invention having one or more of the novel features of this invention as set forth above or hereinafter shown or described.

Another object of this invention is to provide a closed fluid filled system that has been tested by such a method.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
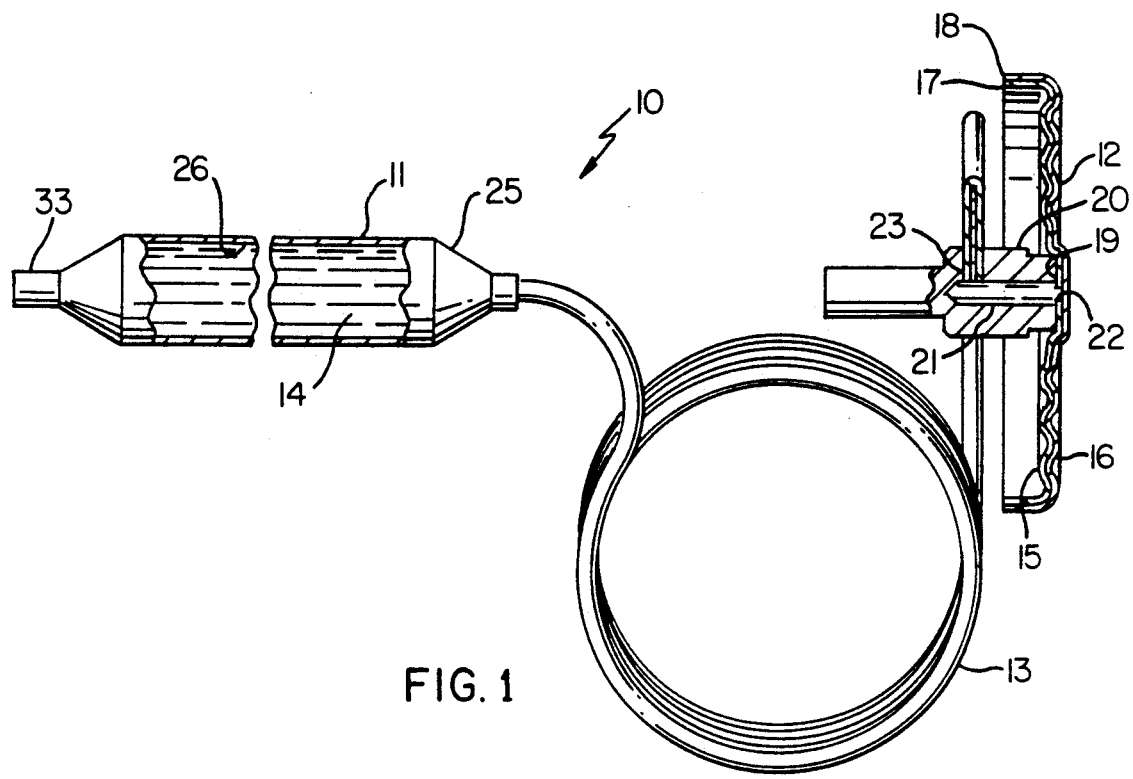
FIG. 1 is a side view, partially in cross section, illustrating a typical closed fluid filled system that can be tested for leaks by the method of this invention.
Figure 2:
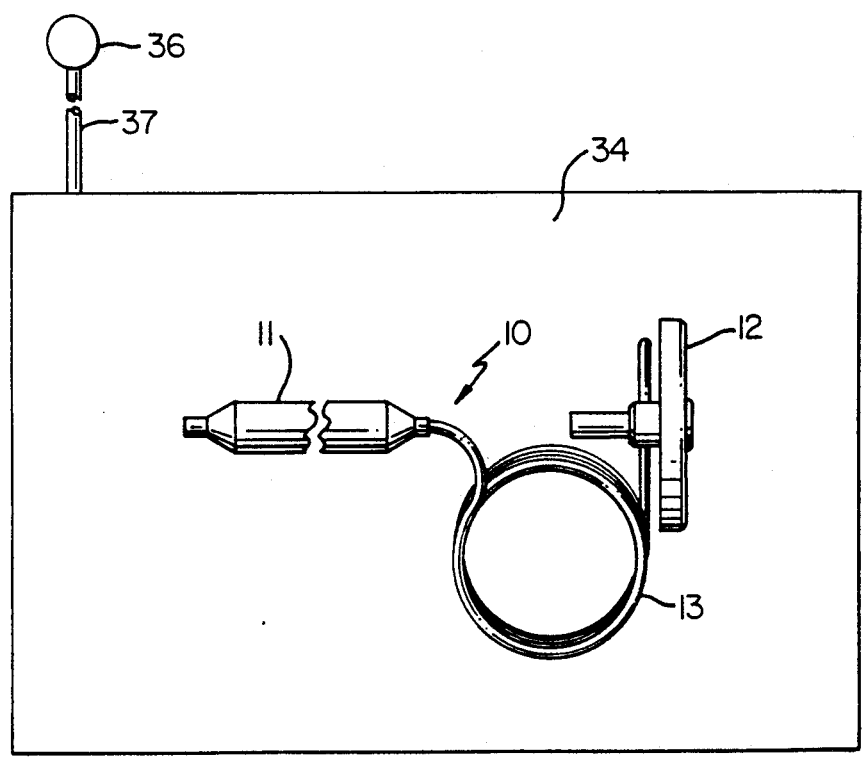
FIG. 2 is a reduced view and illustrates the system of FIG. 1 disposed in a testing chamber of this invention.

While the various features of this invention are hereinafter illustrated and described as being particularly adapted to provide a method of testing for leaks in a closed fluid filled system of a particular type, it is to be understood that the various features of this invention can be utilized singly or in various combinations thereof to provide a method of testing for leaks in other types of closed fluid filled systems.

Therefore, this invention is not to be limited to only the embodiment illustrated in the drawings, because the drawings are merely utilized to illustrate one of a wide variety of uses of this invention.

Referring now to FIG. 1, a typical closed fluid filled system is generally indicated by the reference numeral 10 and comprises a temperature sensing bulb 11 that is interconnected to an expandable and contractable diastat means 12 by a capillary tube 13, such system 10 being formed of any suitable material or materials, such as metallic materials, and being filled with a fluid 14 which expands upon sensing temperature raise and contracts upon sensing the fall of temperature all in a manner well known in the art. Such fluid 14 filling the closed volume of the system 10 can comprise a liquid, such as a hydrocarbon oil, silicon oil, liquid metal, etc., as is also well known in the art, or can comprise a gas as is also well known in the art.

Figure 4:
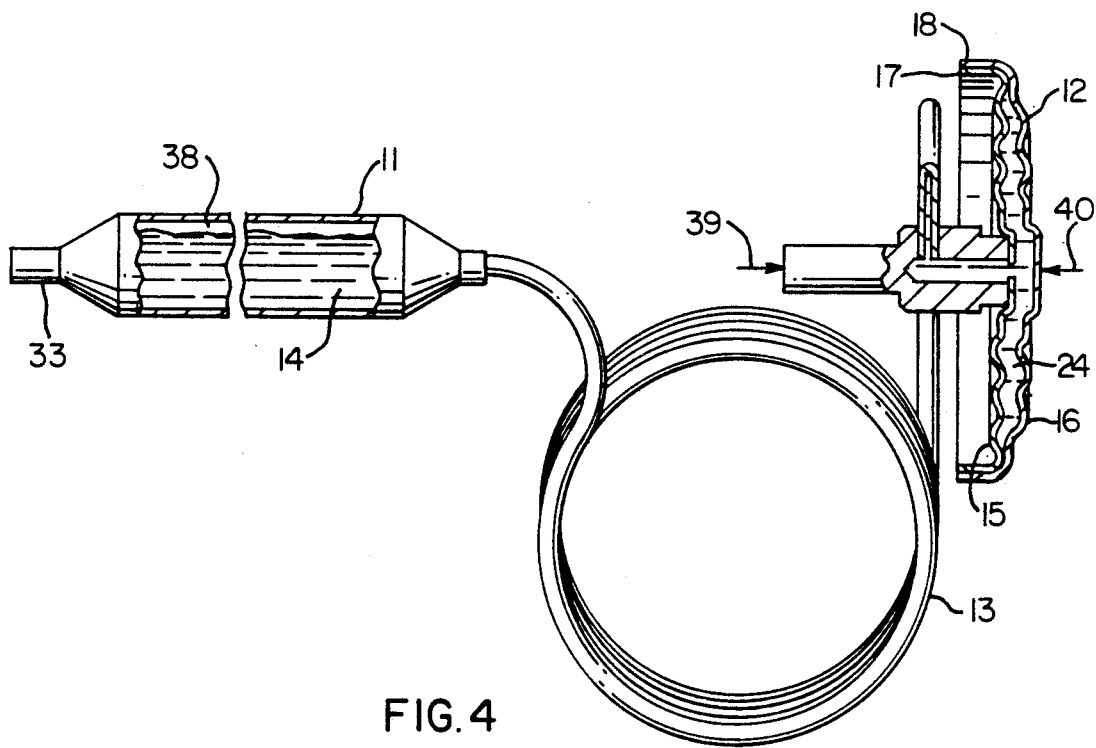
FIG. 4 illustrates the system of FIG. 3 after being removed from the chamber of FIGS. 2 and 3 and being in an adverse expanded condition thereof as the same has leak path means that created such adverse expanded condition which is being detected by the detecting step of the method of this invention.

The diastat means 12 comprises two corrugated metallic wafers 15 and 16 secured together at their respective outer ends 17 and 18 so that the wafer 16 can expand away from the wafer 15 in the manner illustrated in FIG. 4 upon an expansion of the fluid 14 in the system 10, such as upon the fluid 14 sensing a temperature rise above the normal at rest temperature of the system 10 wherein the wafer 16 is collapsed under the natural spring force of the wafer 16 to its at rest or home position illustrated in FIG. 1 against the wafer 15 that has its central part 19 secured to a rigid member 20 that has an internal passage 21 thereof aligned with a central opening 22 in the center of the wafer 15 and being fluidly interconnected to an end 23 of the capillary tube 13. In this manner, the expanding fluid 14 in the system 10 can force apart the wafers 15 and 16 in the manner illustrated in FIG. 4 to create and fill an expanding space 24 therebetween that increases upon increasing expansion of the fluid 14 and such movement of the wafer 16 away from the wafer 15 is normally utilized to control electrical switch means and the like when the temperature sensed by the system 10 exceeds a set temperature. Comversely, as the temperature sensed by the bulb 11 falls below the set temperature, the fluid 14 in the system 10 has contracted so that the wafer 16 moves closer to the wafer 15 to cause the electrical switch means to be operated to the other condition thereof. For example, see the U.S. patent to Sigler, U.S. Pat. No. 5,121,653 and the U.S. patent to Nguyen, U.S. Pat. No. 4,863,092 for respectively disclosing control devices utilizing a system similar to system 10 and a method of making such a system 10.

Therefore, since the method of making and operating the system 10 is well known in the art, a further description of the system 10 is deemed unnecessary to understand the features of this invention hereinafter described.

However, it is also well known that in the method of making the system 10 (or other closed fluid filled systems), various adverse and unintended leak paths can exist between an exterior means 25 and an interior means 26 of the system 10 that defines the closed volume of the system 10 for the fluid 14. Such various sized leak paths can exist not only in the walls of the structural elements 11, 12, 13 and 20 of the system 10, but also can exist at one or more certain joint areas thereof such as represented by the arrows 27, 28, 29, 30, 31 and 32 illustrated in FIG. 3 during the making of the system 10. Thus, the fluid 14 of such system 10 may subsequently leak out of the system 10 through one or more such leak paths and thereby prevent the system 10 from expanding the movable part 16 of the diastat 12 to a particular position relative to the member 20 when the system 10 is sensing a particular temperature so that the device being controlled by such system 10 would not be accurately controlled as intended.

Therefore, it is well known that such systems 10 must be tested for any adverse leakage paths thereof before such systems 10 can be utilized for their intended purposes.

While the system 10 can be filled with the fluid 14 in any suitable manner, one such procedure is to completely make the system 10 from the parts 11, 12, 13 and 20 while leaving the free end 33 of the bulb 11 in an open condition. The system 10 is then submerged in a bath of the fluid 14 while the fluid 14 is at the at rest temperature for the system and with the high point of the system 10 in such submerged condition being the end 33 so that once the system 10 is completely filled with the fluid 14 under the at rest condition of the system 10, the end 33 of the bulb 11 is sealed closed so that the system 10 will be normally in the at rest condition of FIG. 3 when the system 10 is sensing a certain temperature, such as room temperature at ambient pressure and will cause expansion of the part 16 to various positions away from the part 15 as the bulb 11 is sensing various certain higher temperatures than the at rest temperature of the system 10.

In order to test the system 10 for any adverse leaks, it is believed according to the teachings of this invention that the system 10 (as well as a plurality of systems 10 or any combination of closed fluid filled systems) in its unassembled condition as illustrated or after having been assembled in a control unit can be disposed in a chamber 34 of a high pressure chamber means 35 which can have a fluid, such as air or other suitable gas or liquid, forced therein under pressure from any suitable source, such as source 36 being interconnected to the chamber 34 by suitable conduit means 37. Such fluid can be at any regulated temperature and pressure so as to maintain the temperature in the chamber 34 at a desired temperature. Thus, the fluid 14 in the system 10 while the system 10 is in the chamber 34 will also be maintained at that desired temperature. Of course, the chamber means 35 can have any other suitable means for maintaining the temperature therein at the desired temperature, as desired.

Figure 3:
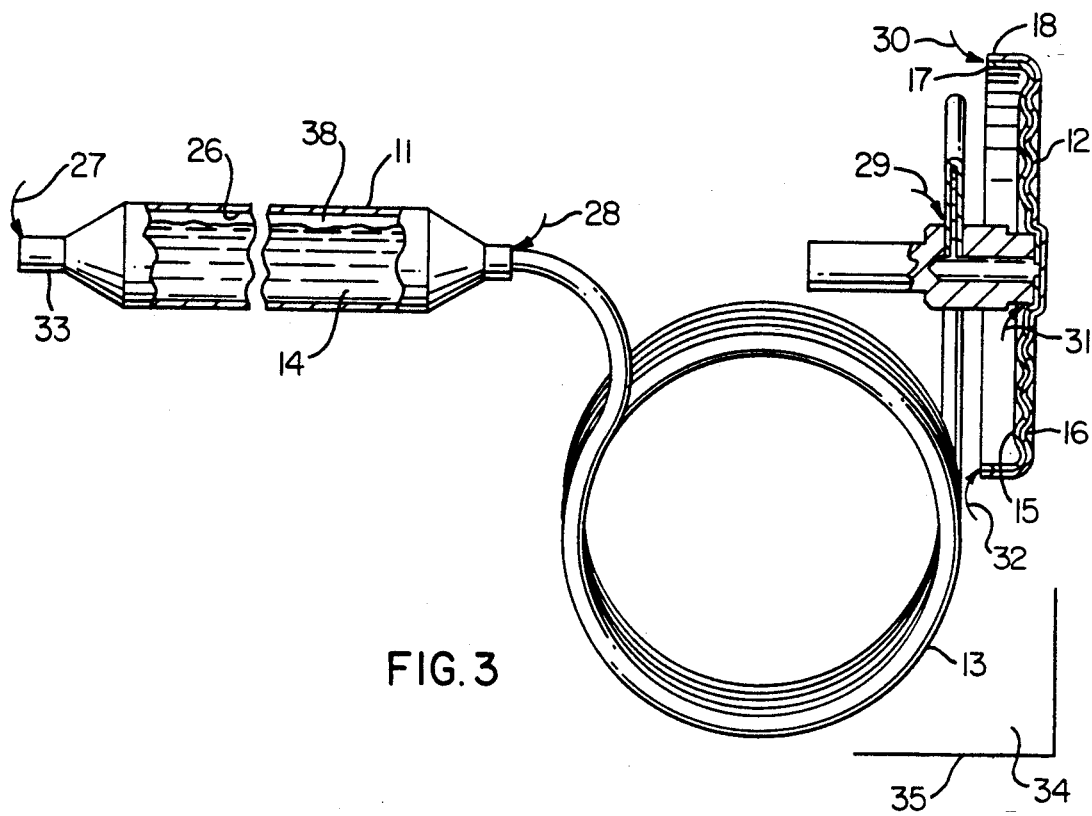
FIG. 3 is a view similar to FIG. 1 illustrating the system of FIG. 1 being operated on by the fluid pressure in the chamber of FIG. 2.

In any event, it is believed that when the fluid 14 in the system 10 is a liquid and the temperature in the chamber 34 is being maintained at a temperature below whatever temperature the system 10 was designed to produce the at rest position of the expandable part 16 in its completely collapsed condition against the disc 15 as illustrated in FIG. 1 when the liquid 14 just completely fills the closed volume of the system 10, the system 10 will have the fluid 14 thereof contract in such a manner as illustrated in FIG. 3 to create a void space 38 (or a plurality of void spaces) in the closed volume thereof that is defined by the interior surface means 26 of the system 10 in the at rest condition thereof. Since the fluid in the chamber 34 is under a pressure greater than the fluid pressure in the void space 38 of the system 10, which will be approximately zero (absolute) if the fluid 14 of the system 10 is a liquid, such fluid under pressure in the chamber 34 will seek out any leak path in the system 10 that is of a certain size or larger and pass through such leak path or leak paths to fill the space 38 due to the differential pressure that exists between the pressure in the chamber 34 and the pressure in the space 38. Thus, after a certain time period, the void 38 in the interior of the system 10 will be filled with the fluid from the chamber 34 until the internal pressure in the space or void 38 rises to substantially the pressure of the fluid in the chamber 34.

Thereafter, the system 10 can be removed from the chamber means 35 and be subjected to a certain pressure and temperature condition, such as at atmospheric pressure and the at rest temperature of the system 10 whereby as the temperature of the fluid 14 in the system 10 increases back to the certain temperature, not only does the fluid 14 in the system 10 expand back to its normal temperature condition and because the void space 38 is now filled with the fluid from the chamber 34, such expansion of the fluid 14 causes the expandable part 16 of the diastat means 12 to move away from the wafer 15 a certain amount, but also the fluid now in the void space 38 expands back to its certain temperature condition to add to the expansion of the fluid 14, and, if the fluid in the void space 38 is a gas, the gas was forced into the void space 38 under many atmospheres of pressure and when the system 10 is now subjected to the certain pressure of only one atmosphere of pressure that exists outside the chamber 34, the high gas pressure in the void space 38 greatly adds to the previous actions to further move the wafer 16 away from the wafer 15 a certain amount that is representative of the amount of leakage through the leak path or leak paths of the system 10 and such expansion can be readily detected by applying certain testing pressure against the system 10 in the direction of the arrows 39 and 40 in FIG. 4 to detect for such adverse expansion of the system 10 which would indicate a system 10 that has at least one adverse leak path therein. Obviously, a system 10 that does not have any adverse leak path therein will permit the fluid 14 to expand back to fill the void space 38 so that the expandable part 16 will not be expanded away from the disc 15 an amount that would indicate that the system 10 should not be utilized.

In this manner, it can be seen that the fluid in the chamber 34 can be a fluid which has molecules many times smaller than the fluid molecules of the fluid 14 of the system 10. For example, if the fluid in the chamber 34 is a gas, such as air, the molecules thereof will be thousands of times smaller than the molecules of the fluid 14 in the system 10 when the fluid 14 is a liquid so that it is believed that a leak path many times smaller than normally detected by prior known testing methods can be found by the method of this invention and that leak paths of the same size can be detected in a very short time.

It is also believed that the pressure differential being created across the system 10 in the chamber 34 by the method of this invention can be many times higher than the pressure in the system 10 and will cause no structural damage to the system 10 because of the normal construction thereof.

It is also believed that the temperature in the chamber 34 can be lowered to the freezing point of the fluid 14 in the system 10 or below such temperature without degradation thereof.

In contrast, the prior known testing method requires the average system temperature to be raised and maintained for an extended period of time so that the sensitivity of this prior known testing method is controlled by the length of time the system is held at elevated temperature-pressure and the relative size of the liquid molecule compared to the size of the leak path means. Thus the driving force is the pressure differential of system pressure (absolute) minus ambient pressure (absolute) and the structural strength of the system 10 and the temperature limits on the liquid 14 will not allow too great of a pressure differential to be created so that a relatively long test period is required.

Thus, it can be seen that this invention provides a new method of testing for leaks in a closed fluid filled system as well as a system tested by such a method.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of testing for leaks in a closed fluid filled system that has a part thereof that expands outwardly from an at rest position that occurs when said system is sensing a temperature at or below an at rest temperature to various certain expanded positions in relation to various certain higher temperatures sensed thereby than said at rest temperature, the improvement comprising the steps of disposing said system in a chamber, disposing a fluid in said chamber under a pressure that is greater than the fluid pressure in the closed volume of said system while sensing the particular temperature that exists in said chamber so that if at least one leak path of a certain size or larger exists in said system from the exterior thereof to the interior thereof a certain amount of said fluid of said chamber will be forced through said at least one leak path to change the fluid condition in said closed volume of said system, removing said system from said chamber after a certain time period, then subjecting said system to a certain pressure and temperature condition so that said part of said system will be in an adverse expanded position beyond its normal position for that said certain pressure and temperature if said at least one leak path of at least said certain size existed, and then detecting said adverse expanded position of said part of said system.

2. A method as set forth in claim 1 wherein said fluid in said system before testing for said leaks comprises a liquid.

3. A method as set forth in claim 2 wherein said liquid comprises an oil.

4. A method as set forth in claim 2 wherein said fluid under pressure in said chamber comprises a gas.

5. A method as set forth in claim 4 wherein said gas comprises air.

6. A method as set forth in claim 4 and including the step of lowering the temperature in said chamber to a temperature that is below said at rest temperature of said system.

7. A method as set forth in claim 6 wherein the step of subjecting said system to a certain pressure and temperature comprises the step of subjecting said system to room pressure and temperature.

8. A method as set forth in claim 7 wherein the step of detecting said adverse expanded position comprises the step of applying a pressure on said part in a direction to move said part toward said at rest position thereof.

9. A method as set forth in claim 1 wherein said system comprises a temperature sensing bulb interconnected to a diastat unit by a capillary tube.

10. In a method of testing for leaks in a closed liquid filled system that has a part thereof that expands outwardly from an at rest position that occurs when said system is sensing a temperature at or below an at rest temperature to various certain higher temperatures sensed thereby than said at rest temperature, the improvement comprising the steps of disposing said system in a chamber that has a temperature below said at rest temperature so that said system creates a void in the closed volume thereof, disposing in said chamber a fluid under a pressure that is greater than the fluid pressure in said void so that if at least one leak path of a certain size or larger exists in said system from the exterior thereof to the interior thereof a certain amount of said fluid of said chamber will be forced through said at least one leak path to at least partially fill said void, removing said system from said chamber after a certain time period, then subjecting said system to a certain pressure and temperature condition so that said part of said system will be in an adverse expanded position beyond its normal position for that said certain pressure and temperature if said at least one leak path of at least said certain size existed, and then detecting said adverse expanded position of said part of said system.

11. A method as set forth in claim 10 wherein said liquid comprises an oil.

12. A method as set forth in claim 10 wherein said fluid under pressure in said chamber comprises a gas.

13. A method as set forth in claim 12 wherein said gas comprises air.

14. A method as set forth in claim 12 wherein the step of subjecting said system to a certain pressure and temperature comprises the step of subjecting said system to room pressure and temperature.

15. A method as set forth in claim 14 wherein the step of detecting said adverse expanded position comprises the step of applying a pressure on said part in a direction to move said part toward said at rest position thereof.

16. A method as set forth in claim 10 wherein said system comprises a temperature sensing bulb interconnected to a diastat unit by a capillary tube.

* * * * *